G. S. EDELEN.
MEANS FOR AUTOMATICALLY REGULATING THE SUPPLY OF HEATING MEDIUM
FOR SCIENTIFIC AND SIMILAR APPARATUS.
APPLICATION FILED FEB. 27, 1909.
923,957.
Patented June 8, 1909.
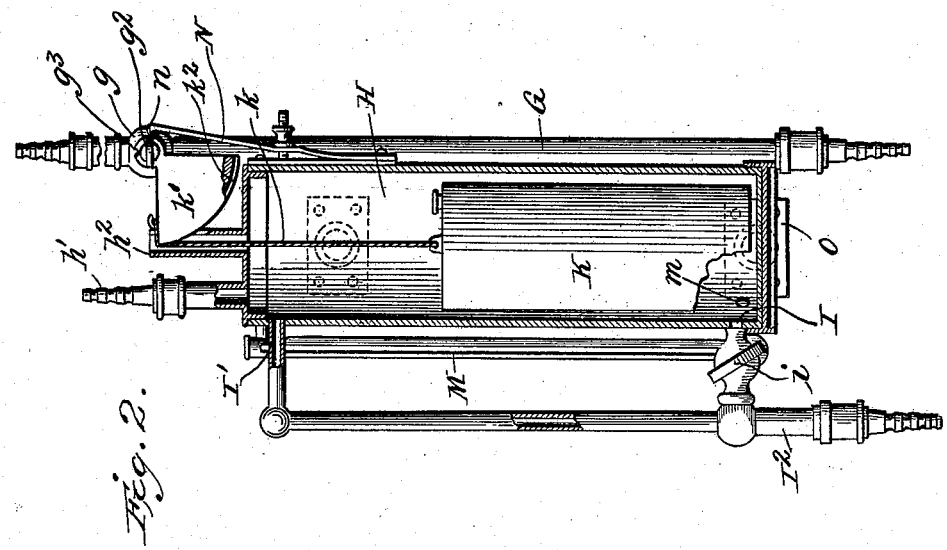
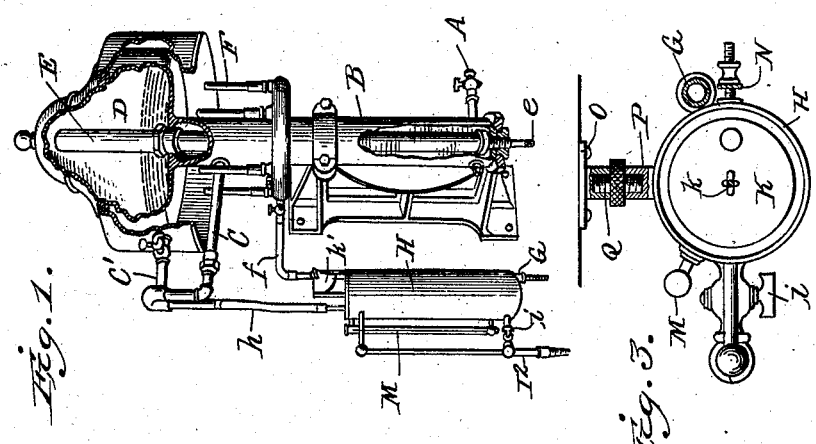
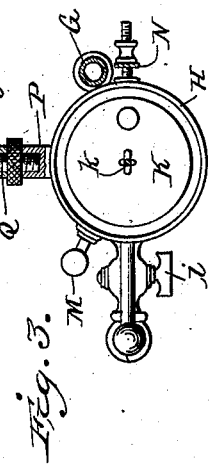
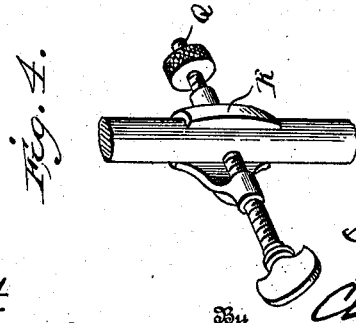
Witnesses
Thomas Durant
J. G. Hutchinson Jr.
Inventor
George S. Edelen
By Church & Church
his Attorneys

UNITED STATES PATENT OFFICE.

GEORGE S. EDELEN, OF WASHINGTON, DISTRICT OF COLUMBIA.

MEANS FOR AUTOMATICALLY REGULATING THE SUPPLY OF HEATING MEDIUM FOR SCIENTIFIC AND SIMILAR APPARATUS.

No. 923,957.  Specification of Letters Patent.  Patented June 8, 1909.

Application filed February 27, 1909. Serial No. 480,403.

*To all whom it may concern:*

Be it known that I, GEORGE S. EDELEN, of Washington, in the District of Columbia, have invented a certain new and useful Improvement in Means for Automatically Regulating the Supply of Heating Medium for Scientific and Similar Apparatus; and I do hereby declare the following to be a full, clear, and exact description of the same, reference being had to the accompanying drawings, forming a part of this specification, and to the figures and letters of reference marked thereon.

This invention has for its object the production of an apparatus which will safeguard scientific apparatus etc. and more especially that type of apparatus through which a constant flow of water is maintained, either for the purpose of distillation, extraction or the production of a uniform temperature in drying ovens etc. Apparatus of this general character is heated by means of burners or equivalent means for supplying the heating medium and one of the inherent dangers and defects in such apparatus as heretofore constructed has been due to the lack of provision for automatically reducing the supply of heating medium or for entirely cutting the same off when the flow of water through the apparatus ceases. Owing to this defect such apparatus is liable to be accidentally destroyed by a continuance of the heating after the flow of water has been stopped and in some instances, particularly in connection with distilling apparatus for volatile liquids, serious accidents have occurred because of the inflammable nature of the vapors driven off and uncondensed when the flow of water has ceased from any cause.

In the accompanying drawings the present invention has been shown in connection with an ordinary and well known type of distilling apparatus.

Figure 1 shows partly in section and partly in elevation a Jewell's distilling apparatus to which the present invention has been applied for automatically shutting off the supply of gas to the burners whenever the flow of water through the distilling apparatus ceases. Fig. 2 is a sectional elevation on an enlarged scale of the automatic controlling mechanism shown in Fig. 1. Fig. 3 is a top plan view, with the top of the float chamber removed and the gas supply pipe in section. Fig. 4 is a detail view showing a modified form of supporting clamp.

Like letters of reference in the several figures indicate the same parts.

While the distilling apparatus illustrated in Fig. 1 is well known and its operation generally understood, it may be stated that water is admitted in a constant stream through the supply pipe A at the bottom of the condensing column B, and escapes from the top of said column through a pipe C from which a branch C' leads to the heating chamber D of the still. The vapors are discharged from the heating chamber D through the central downwardly extending duct E wherein they are condensed during their downward passage through the condensing column and are finally discharged at e in the form of a liquid. The heating chamber D is heated by the gas flames from burners F and the latter receive their gas supply through the gas supply pipe f.

In accordance with the present invention the gas supply pipe f forms a continuation of a vertically arranged section of gas pipe G having a stop cock g therein. Connected with said gas supply pipe G and formed as a portion of the same structure, is a vertically disposed water chamber H into the upper end of which the overflow and constantly running discharge from the still empties through a pipe connection h h'. Two discharge ducts are provided for the water chamber H, one of such ducts lettered I being preferably of relatively large capacity and located near the bottom of the chamber and the other of said ducts lettered I' being located near the top of said chamber. The proportionate capacity of said passages is preferably such that the lower discharge I will have a discharge capacity substantially equal to or but very slightly less than the normal overflow or discharge from the apparatus to be protected, and the discharge passage I' is of sufficient capacity to carry off any excess. In the preferred adjustment, under normal conditions a slight discharge will take place through the upper passage I' when the apparatus is in operation. The lower discharge duct I is preferably provided with a stop cock i whereby its capacity may be adjusted to suit particular conditions of operation, or to adapt the apparatus for use in connection with an overflow of greater or less volume, but for convenience the two discharge ducts I and I' are branches of the same main discharge pipe I² from the lower end of which a waste pipe may lead off to any convenient sink or trap.

A relatively heavy float or counterweight K is located within the water chamber H and is preferably of such size as to require but a relatively small volume of water within the chamber H in order that it may be counterbalanced by the surrounding water sufficiently to permit the valve to remain open when the chamber is substantially full. For this purpose the counterbalance K need not, and preferably does not, actually float in the body of water. The float is connected by a flexible connection $k$ with a quadrant $k'$ mounted on and adapted to turn with the stop cock $g$ in the gas pipe, and the relative arrangement of these parts is such that when the float K is elevated the stop cock may be turned on and when the float is at or near the bottom of its range of movement the stop cock will be entirely closed.

As a convenient and preferred arrangement, the quadrant $k'$ is provided with a peripheral groove $k^2$ in which the flexible connection will pay and for the protection of said flexible connection a slotted tubular projection $h^2$ extends upwardly from the top of the water chamber H in position to surround the connection. The slot is in position for the quadrant $k'$ to work through the same, whereby no portion of the flexible connection is exposed nor is it liable to be accidentally displaced. For the purpose of observing the level of the water in the water chamber as an aid in adjusting the discharge cock $i$, a gage glass M is located at one side of the chamber and connected therewith at the bottom through a passage or duct $m$.

In the operation of the device, the water and gas connections having been established as described and the overflow of water into the chamber H started, the attendant by means of the stop cock $i$, regulates the bottom discharge from the chamber until there is a minimum discharge from the top of the chamber or the height of the water in the chamber is maintained at a proper point to counterbalance the float and allow the stop cock $g$ to remain open, when the gas is turned on by means of the handle $g^2$ provided for the purpose. In order to guard against irregularity of action in closing the stop cock $g$ a yielding retainer is provided which will offer some resistance to the inauguration of the closing movement but after said movement has been inaugurated the resistance will be removed and the movement may continue in a uniform manner. In the preferred arrangement, the stop cock is provided at one side with a notch or recess $g^3$ and the chamber H is provided with an adjustable spring N having its end bent at $n$ to enter said recess when the stop cock is open, the end of said spring, however, riding upon a concentric surface at all times save when the stop cock is in its open position. With this arrangement a considerable lowering of the water level in the chamber H may take place before the closing movement of the stop cock is inaugurated, but when said movement is inaugurated it will continue and the parts may be adjusted so as to secure a sudden and complete closing whenever the water level has been lowered to the proper point.

The apparatus is adapted to be mounted upon wall brackets O, Figs. 2 and 3, when used in connection with stills similarly supported, as shown in Fig. 1, although it is preferred to so construct the apparatus that it may be conveniently mounted either on wall brackets or on a vertical standard or stand such as is commonly used in laboratories. To accomplish this, the chamber H may be conveniently provided with projections P adapted for coöperation with standard clamps or wall brackets, as the case may be, and, as shown, a connecting stem Q having right and left hand threads is provided as the connecting means. One end of said stem may be screwed into the projection P and the other into the wall bracket O or said connecting stem may be screwed into a standard clamp R, Fig. 4, and the other end into the projection P. Obviously, two or more projections may be provided to form a stable supporting means and various well-known clamps and brackets may be utilized instead of the particular devices shown.

While the device of apparatus of the present invention has a somewhat wide range of utility, it is particularly designed for use in connection with apparatus adapted to be heated by gas burners such as extraction apparatus, drying ovens, water baths, Fletcher water heaters, Kjeldahl's distilling apparatus, etc., in which a constant flow of water is maintained.

It is obvious that while the stop cock $g$ is designed in the form of apparatus shown, for controlling a supply of gaseous heating medium, the quadrant $k'$ may be utilized for controlling or shutting off the supply of any kind of heating medium which may be used for heating in constant flow apparatus and hence I do not wish to be limited herein to apparatus adapted solely for the control of a gaseous heating medium.

In the operation of the apparatus it will be understood that the constant water supply provides a constant discharge from the apparatus which is led into the pipe $h$. This discharge from the apparatus to be protected must obviously be equal to or in excess of the discharge capacity of the discharge duct I in order that the liquid may be maintained at a sufficient level to float or support the float K. To regulate the proper discharge from the bottom of the float chamber the stop cock *i* is adjusted until the level of the liquid in the chamber will stand sufficiently high to support the float at the desired point. Usually a small or slight discharge takes place through the discharge duct I' while the major discharge takes place through the discharge duct I. Under such circumstances a diminution or cessation of the flow of water through the apparatus to be protected will immediately cause a lowering of the water level in the float chamber because the water will escape from said chamber more rapidly than it flows into the same and consequently the counterbalance for the float will be removed and the stop cock or other control device for the heating medium will be operated to cut off the supply of heat and thereby prevent either the destruction of the apparatus to be protected, or the continued volatilization of an inflammable liquid which might produce dangerous conditions were the flame permitted to continue in the presence of said volatilized liquid.

Having thus described my invention, what I claim as new and desire to secure by Letters Patent, is:

1. A device for controlling the supply of heating medium to apparatus through which a constant flow of water is maintained, embodying a float chamber into which the constant discharge from said apparatus flows, a relatively heavy float in said chamber, means for turning off the supply of heating medium connected with and operated by said float to cut off the supply of heating medium when the chamber is empty, discharge ducts for said chamber located at the top and bottom of the same respectively, the discharge pipe at the bottom of said chamber being arranged to have a discharge capacity not in excess of the discharge from the apparatus to which the heating medium is supplied.

2. In a device for controlling the supply of heating medium to apparatus through which a constant flow of liquid is maintained, the combination with the heating medium supply conductor having a controller therein for turning off the heating medium supply, a chamber into which the discharge from the apparatus to be protected flows, discharge ducts for said chamber located at the bottom and top of the same respectively, means for regulating the discharge capacity of the bottom discharge duct, a float located in said chamber and connected with the controller for the supply of heating medium whereby when said float is elevated the supply of heating medium may be turned on and when said float is lowered the supply of heating medium will be automatically cut off.

3. In a device for the purpose described, the combination with the liquid chamber, relatively heavy float located therein, heating medium supply conductor independent of the liquid chamber and its supply duct, cut off for closing and opening said heating medium supply conductor and connection between said cut off and float, of a liquid supply duct for the chamber independent of the heating medium supply conductor discharge ducts at bottom and top of said chamber respectively, and a cock for regulating the relative capacities of said discharge ducts.

4. In an apparatus for the purpose described, the combination with the float chamber, waste duct leading thereto and discharge ducts at bottom and top respectively of the chamber, with means for regulating the relative discharge capacities of said ducts, of a float located in the chamber, a gas supply pipe connected with the chamber, a cock in said gas supply pipe, a quadrant connected with the cock and a flexible connection between said quadrant and float, the arrangement being such that when the float is elevated the cock may be opened and when the float drops to its lower position the cock will be automatically closed.

5. In an apparatus for the purpose described, the combination with the float chamber having supporting brackets at one side thereof, a gas supply pipe rigidly connected with said chamber and having a stop cock therein provided with a quadrant shaped projection, of a float located within the chamber, a flexible connection intermediate the float and quadrant shaped projection, a waste discharge pipe entering said chamber and adapted to be connected with the apparatus to be protected, and discharge ducts at bottom and top of said chamber respectively, substantially as described.

6. In an apparatus for the purpose specified, the combination with the vertically arranged cylindrical float chamber, gas supply pipe connected rigidly therewith, stop cock in said gas supply pipe above the level of the chamber and having a quadrant shaped projection thereon and the float located within the chamber and connected with said quadrant shaped projection, of a supply opening into the upper end of said chamber from the apparatus to be protected, discharge ducts leading from said chamber at bottom and top respectively, and a common discharge duct with which said discharge ducts communicate; substantially as described.

7. In an apparatus for the purpose specified, the combination with the float chamber, float located therein and supply and discharge ducts for the liquid into and out of said chamber, of a rotary heating medium control device connected with said float and a yielding retainer for resisting the inauguration of the closing movement of said control device.

8. In a device for the purpose specified, the combination with the float chamber having the entrance and discharge ducts for the liquid into and out of said chamber and the float located within said chamber, of the heating medium control device connected with said float, a spring pressed retainer coöperating with said control device and a shoulder with which said retainer coöperates to yieldingly resist the inauguration of the closing movement of said device.

GEORGE S. EDELEN.

Witnesses:
 HANNIBAL HATTON,
 ALMA H. EDELEN.